Figure 2:
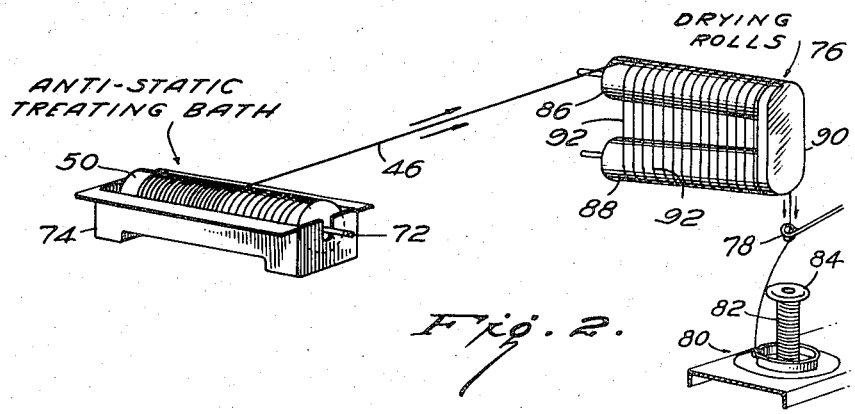

July 3, 1951     A. CRESSWELL     2,558,734
THREAD-TREATING APPARATUS
Original Filed Dec. 30, 1948     4 Sheets-Sheet 1
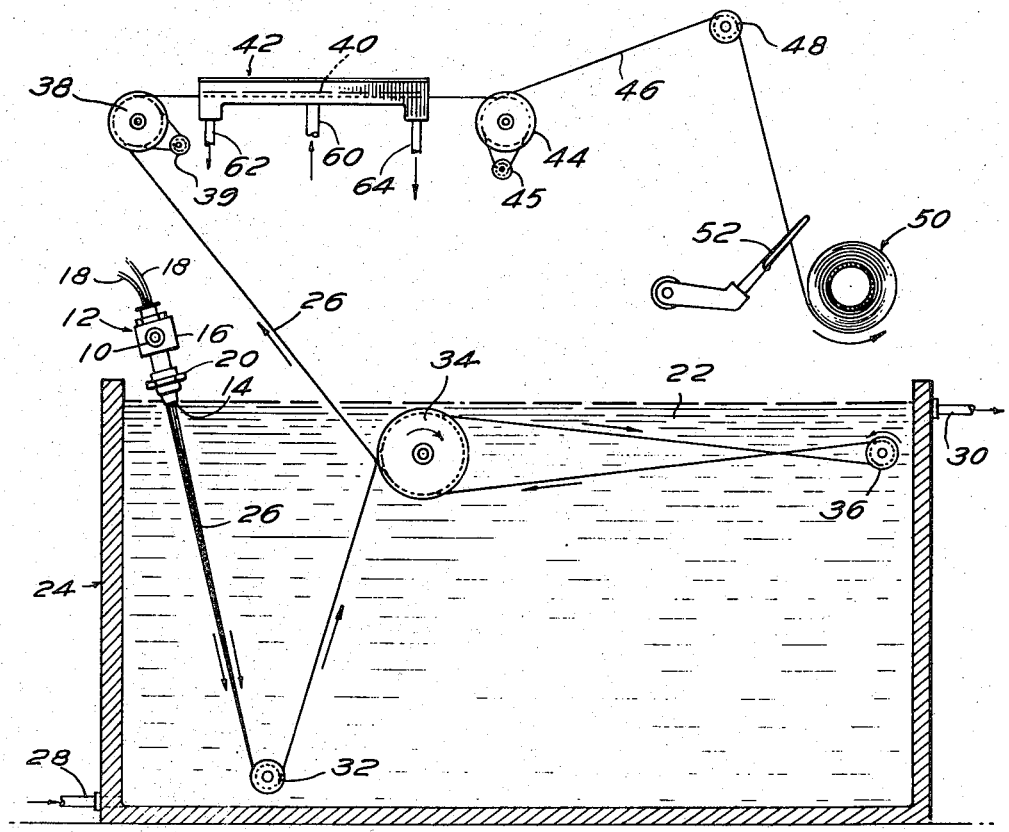
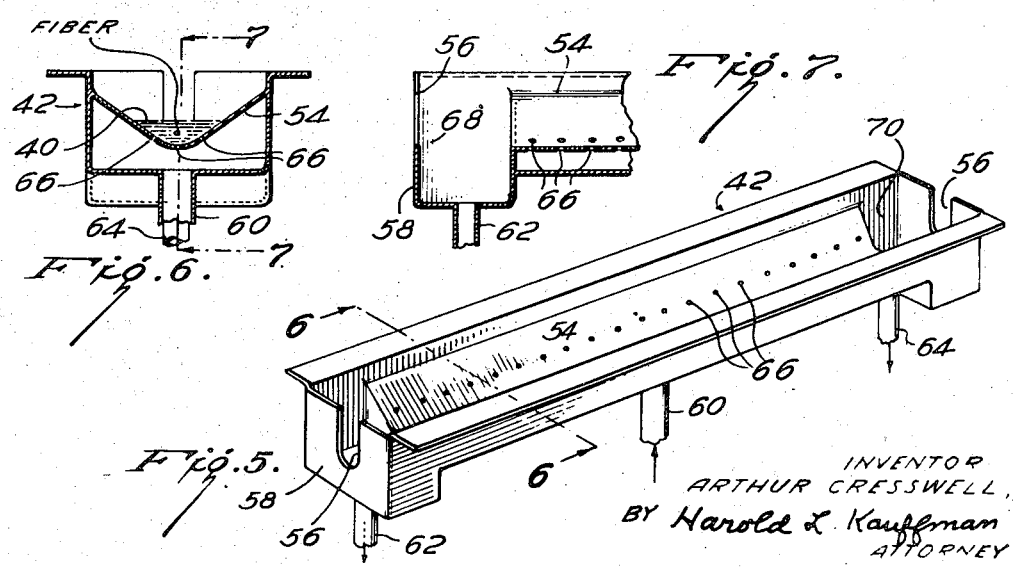
INVENTOR
ARTHUR CRESSWELL,
BY Harold L. Kauffman
ATTORNEY July 3, 1951  A. CRESSWELL  2,558,734
THREAD-TREATING APPARATUS
Original Filed Dec. 30, 1948  4 Sheets-Sheet 2

INVENTOR
ARTHUR CRESSWELL
BY
Harold L. Kauffman
ATTORNEY

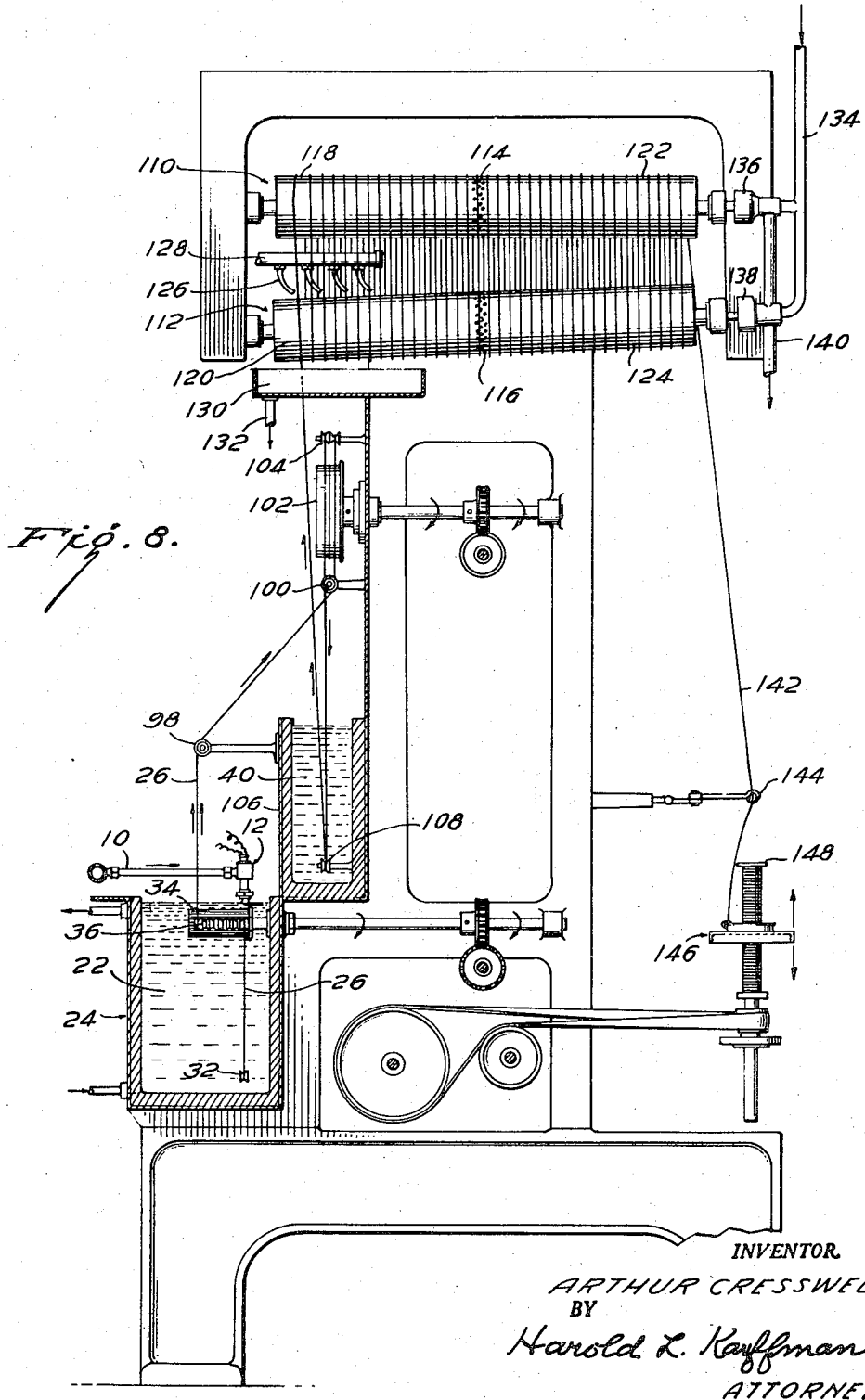

INVENTOR.
ARTHUR CRESSWELL,
BY
Harold L. Kauffman
ATTORNEY

Patented July 3, 1951

2,558,734

UNITED STATES PATENT OFFICE 2,558,734

THREAD-TREATING APPARATUS

Arthur Cresswell, Stamford, Conn., assignor to American Cyanamid Company, New York, N. Y., a corporation of Maine Original application December 30, 1948, Serial No. 68,370. Divided and this application February 28, 1950, Serial No. 146,880

4 Claims. (Cl. 68—181)

This application is a division of my copending application Serial No. 68,370, filed December 30, 1948, and now abandoned. The claims of said application Serial No. 68,370, which now appear in my copending application Serial No. 73,078, filed January 27, 1949, as a continuation-in-part of said application Serial No. 68,370, are directed to a method for the preparation of synthetic fibers from polymers and copolymers of acrylonitrile, and more particularly to certain new and useful improvements in a method of producing fibers (including both monofilaments and multifilaments) from a soluble, thermoplastic product of polymerization of a polymerizable mass comprising mainly acrylonitrile. The claims of the present application are directed to a portion of the apparatus, more particularly apparatus embodying a trough of a new and novel construction which is shown in various figures of the drawing accompanying the said application Serial No. 68,370, and described in the specification thereof, but not claimed therein or in the aforesaid application Serial No. 73,078.

Various methods of producing filaments, films and other shaped articles from acrylonitrile (polymeric acrylonitrile) and from copolymers or interpolymers of a major proportion of acrylonitrile and a minor proportion of another monomer or monomers heretofore have been suggested. For example, in Rein U. S. Patent No. 2,117,210 it is proposed that polyacrylonitrile be dissolved in a quaternary ammonium compound such as benzyl pyridinium chloride, and that the resulting solution be employed in making films, threads and other shaped bodies therefrom. Also, in Rein U. S. Patent No. 2,140,921 it is proposed that various polyvinyl compounds including polyacrylonitrile and copolymers of acrylonitrile with another vinyl compound be dissolved in concentrated aqueous solutions of inorganic (metallic) salts, e. g., the chlorides, bromides, iodides, thiocyanates, perchlorates and nitrates, and that the resulting solutions be used in the manufacture of threads, films, etc. Various organic solvent solutions of polyacrylonitrile and copolymers of at least 85% by weight of acrylonitrile with another monomer are disclosed in U. S. Patents 2,404,713–728, and also the use of such solutions in forming films, filaments, etc., therefrom. In most of these latter patents the aforementioned Rein patents are referred to, as well as the difficulties encountered when effort was made to produce useful filaments and other shaped articles from polyacrylonitrile solutions of the kind proposed by Rein.

The invention disclosed and claimed in my copending application Serial No. 772,200, filed September 4, 1947, is based on my discovery that useful films, filaments, threads and other shaped articles, which are capable of being dyed, can be produced from acrylonitrile polymerization products of the kind described broadly in the first paragraph of this specification, and more specifically in the aforementioned patents as well as hereinafter, by precipitating or coagulating the polymerization product in approximately its desired shape from a water-coagulable solution thereof (e. g., concentrated aqueous salt solutions of the kind disclosed by Rein in his Patent No. 2,140,921), the precipitation being effected by contacting the said solution with a cold liquid coagulant comprising water, more particularly such a coagulant which is at a temperature not substantially exceeding $+10°$ C. This coagulant is a non-solvent for the polymerization product but will dissolve the solvent in which the said product is dissolved. Surprisingly it was found that by keeping the temperature of the aqueous coagulating bath at or below $+10°$ C., e. g. within the range of $-15°$ C. to $+10°$ C. and preferably at from about $-15°$ C. to about $+5°$ C., the precipitated gels in general are clear or substantially clear, tough, ductile and, in filament, thread or other form, can be stretched to orient the molecules, thereby increasing the cohesiveness, tensile strength, toughness, resilience and otherwise improving the properties of the finished product. In marked contrast, if temperatures materially above $+10°$ C. be employed, e. g., temperatures of the order of 20° to 50° C. or higher, the precipitated gels in general are hazy or opaque, weak, friable, have little or no toughness or ductility and are not adapted for stretching to orient the molecules and thereby improve the properties of the dried material.

The invention disclosed and claimed in my aforementioned copending application Serial No. 772,200 is based on my further discovery that the shaped, precipitated gels, e, g., extruded, water-swollen monofilaments and multifilaments, which may be collectively designated as yarns or fibers, and which have been formed in a cold liquid coagulant comprising water at a low temperature of the order of that mentioned in the preceding paragraph, can be materially improved in properties by subjecting the precipitated material in wet, swollen state to tension, as by stretching, in contact with moisture or water and at an elevated temperature, specifically at a temperature within the range of about 70° C. to about 110° C.

Advantageously water at 70° C. to 100° C., preferably at 90° C. to 100° C., is the fluid medium with which the gelled or precipitated fiber or other product is contacted during the stretching operation, but if temperatures above 100° C., e. g., 110° C., are desirable, then an atmosphere of saturated steam may be employed. For optimum results during stretching it is important that moisture or water be present. By thus wet stretching the precipitated product, more particularly to an extent at least twice its original length (that is, at least 100%) and preferably from 3 to 20 or 30 or more times its original length, the molecules are oriented along the fiber axis and a product having increased tensile strength, pronounced fibrillation, toughness, resilience and other improved properties is obtained.

The invention claimed originally in patent application Serial No. 68,370 is concerned with certain new and useful improvements in the process of producing yarns or fibers from polymers and copolymers of acrylonitrile as disclosed and claimed in my aforementioned copending application Serial No. 772,200 and more particularly to an improved process whereby the stretched, water-swollen or aquagel fiber of the acrylonitrile polymerization product can be continuously dried, or, preferably, both continuously spun, stretched and dried whereby a fiber or thread is obtained more quickly and with a minimum of handling so that the product is more uniform and is less subject to damage during processing than, for example, a package-spun fiber or thread.

Figure 3:
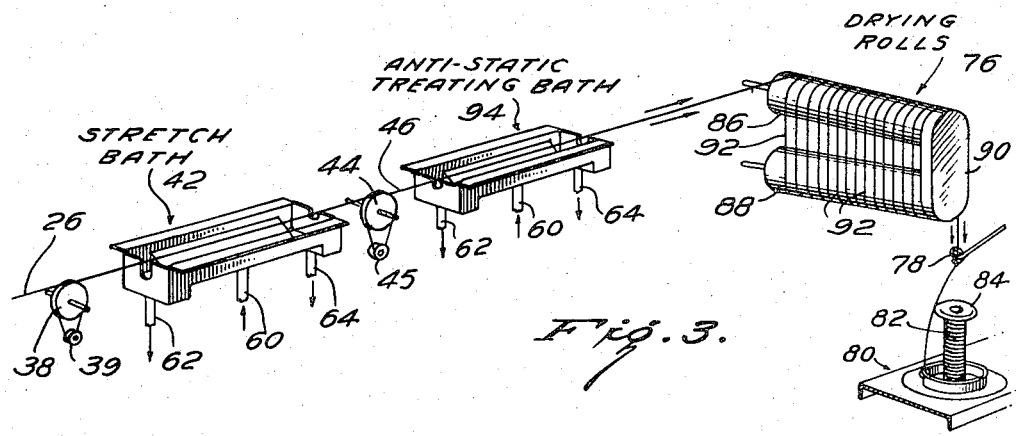
Figure 4:
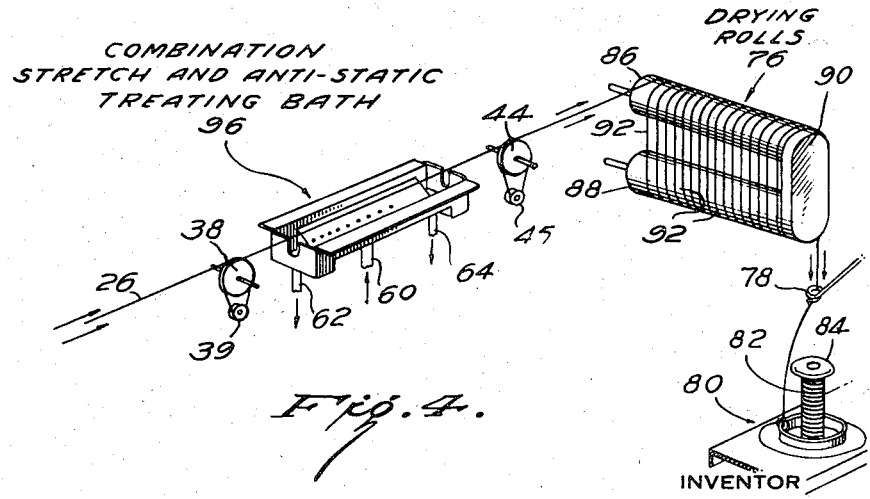
Figure 9:
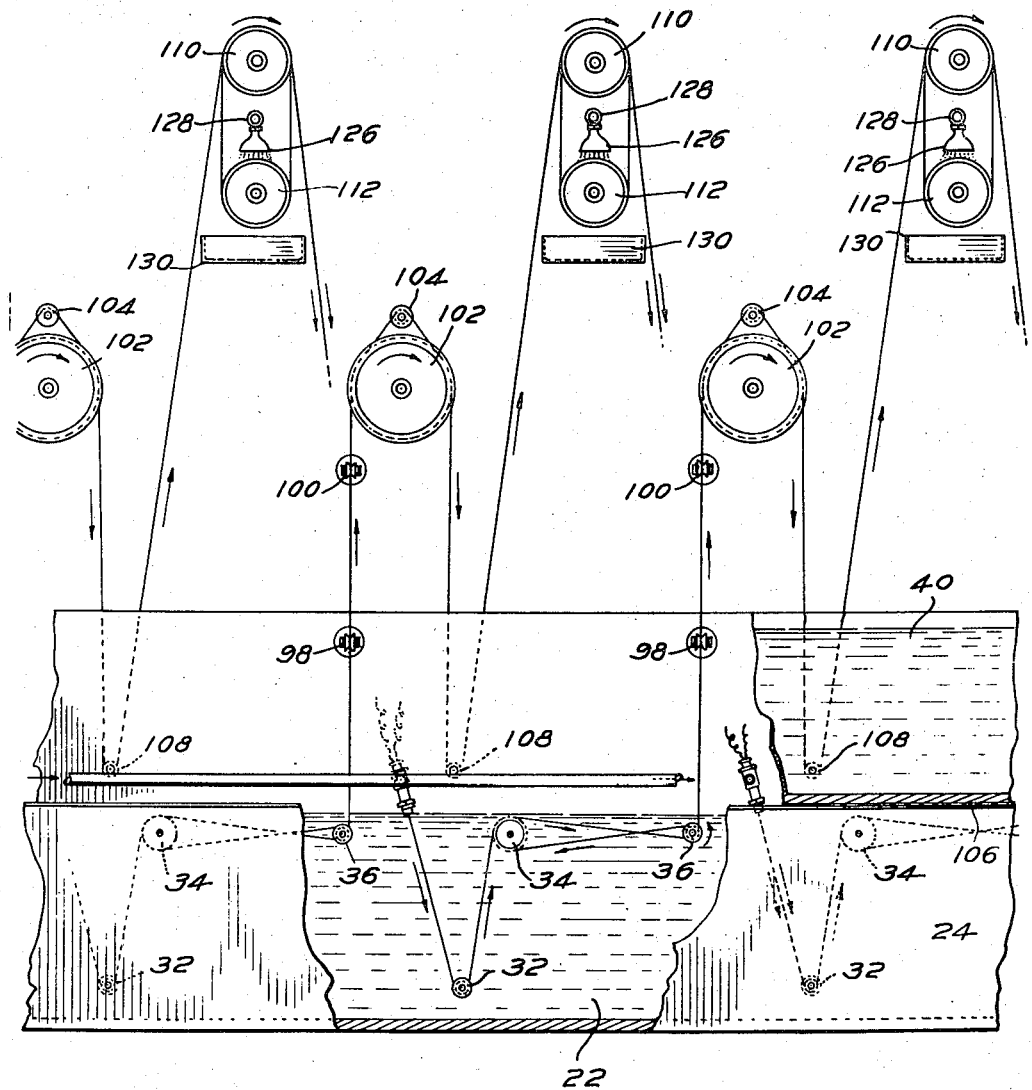

The novel features which are characteristic of the present invention are set forth in the appended claims. The manner in which the apparatus in constructed and used will best be understood by reference to the following more detailed description when considered in connection with the accompanying drawing in which Fig. 1 is a diagrammatic view of one portion and Figs. 2, 3 and 4 are diagrammatic views, shown in perspective, of other portions of apparatus that may be used, and illustrative thereof; Fig. 5 is a view in perspective of a part of the apparatus shown in Fig. 1; Fig. 6 is a transverse sectional view along the line 6—6 of the apparatus shown in Fig. 5; Fig. 7 is a fragmentary sectional view taken along the line 7—7 of Fig. 6; Fig. 8 is a somewhat diagrammatic side view, partly in section, of another and preferred form of apparatus which may be used; and Fig. 9 is a somewhat diagrammatic front view, partly broken away, of the apparatus illustrated in Fig. 8.

In practice, a polymer or copolymer of acrylonitrile is first prepared in accordance with methods now well known to those skilled in the art. In the preparation of copolymers a mixture of monomers comprising mainly, that is, a preponderant proportion by weight of, acrylonitrile is employed, and preferably the acrylonitrile constitutes at least about 50% by weight of the mixture of monomers. If less than about 50% by weight of acrylonitrile be present in the mixture of monomers, the full advantages are not obtained when processing the resulting copolymer in accordance with the invention claimed in the parent application. The monomeric mixture therefore should contain substantially more than 50% by weight of acrylonitrile, e. g., from 55 to 99.5% by weight of acrylonitrile. Illustrative examples of monomers which may be copolymerized with acrylonitrile in proportions such as have been mentioned above to form a copolymer, more particularly a thermoplastic copolymer, are compounds containing a single $CH_2=C<$ grouping, for instance the vinyl esters and especially the vinyl esters of saturated aliphatic monocarboxylic acids, e. g., vinyl acetate, vinyl propionate, vinyl butyrate, etc.; acrylic and alkacrylic acids (e. g., methacrylic, ethacrylic, etc.) and esters and amides of such acids (e. g., methyl, ethyl, propyl, butyl, etc., acrylates and methacrylates, acrylamide, methacrylamide, N-methyl, -ethyl, -propyl, -butyl, etc., acrylamides and methacrylamides, etc.); methacrylonitrile, ethacrylonitrile and other hydrocarbon-substituted acrylonitriles; and numerous other vinyl, acrylic and other compounds which are copolymerizable with acrylonitrile to yield thermoplastic copolymers. Alkyl esters of alpha, beta-unsaturated polycarboxylic acids also may be copolymerized with acrylonitrile to form copolymers which are useful in practicing the present invention, e. g., the dimethyl, -ethyl, -propyl, -butyl, etc., esters of maleic, fumaric, citraconic, etc., acids.

A suitable method of polymerizing the monomeric acrylonitrile or mixture of monomers is in an aqueous emulsion using a suitable polymerization catalyst, e. g., ammonium persulfate. Other polymerization methods, however, also may be employed, e. g., methods such as those described in Bauer et al. U. S. Patent No. 2,160,054. The polymeric or copolymeric acrylonitrile may be of any suitable molecular weight, but ordinarily it will be within the range of 15,000 to 300,0000 or higher, as calculated from viscosity measurements by the Staudinger equation (reference: U. S. Patent No. 2,404,713).

The polymeric or copolymeric acrylonitrile is then dissolved in a solvent from which the polymer (or copolymer) is precipitated or coagulated when the solution is brought into contact (e. g., immediately after extrusion) with a liquid coagulant comprising water, more particularly water which is at a temperature not exceeding substantially +10° C., preferably at or below +5° C., e. g., at from −10° C. to +5° C. Examples of such solvents are concentrated aqueous solutions of water-soluble inorganic salts, more particularly such salts which yield highly hydrated ions in aqueous solution, e. g., the chlorides, bromides, iodides, thiocyanates, perchlorates and nitrates, which salts are disclosed in the aforementioned Rein Patent No. 2,140,921 and the concentrated aqueous solutions of which are the preferred solvents for the acrylonitrile polymerization products, more particularly such a product containing in the molecules thereof an average of at least about 85% by weight of combined acrylonitrile, in carrying out my process. Saturated or nearly saturated aqueous solutions of such salts in some cases may be used. More specific examples of such water-soluble inorganic salts are zinc chloride, calcium chloride, lithium bromide, cadmium bromide, cadmium iodide, sodium thiocyanate, zinc thiocyanate, aluminum perchlorate, calicum perchlorate, calcium nitrate, zinc nitrate, etc. Other examples of suitable solvents are concentrated aqueous solutions of guanidine thiocyanate, the mono- (lower alkyl)-substituted guanidine thiocyanates and the symmetrical and unsymmetrical di-(lower alkyl)-substituted guanidine thiocyanates. These solutions containing dissolved polymeric or copolymeric acrylonitrile are more fully described and are specifically claimed in my copending application Serial No. 772,201, filed September 4, 1947, now Patent No. 2,533,224, issued December 12, 1950. I prefer to use a concentrated aqueous solution of a thiocyanate as the solvent for the acrylonitrile polymerization product.

With reference to the accompanying drawing and more particularly to Fig. 1 thereof, a water-coagulable solution of the polymeric or copolymeric acrylonitrile, which has been filtered (if necessary) and de-aerated, is passed under pressure from a supply reservoir (not shown) through the conduit 10 (Figs. 1 and 8) into a spinneret coupling or heading 12, which preferably is designed so that the solution can be heated, e. g., by electrical, hot water, steam or other means, prior to extrusion through the spinneret 14. A suitable design of a spinneret coupling, which is heated by electrical means, is shown in Fig. 2 of the drawing accompanying my aforementioned copending application Serial No. 772,200. The device there illustrated, and portions of which will be described herein with reference to Fig. 1 of the present drawing, comprises a male coupling 16 in which is annularly spaced an electrically heated cartridge provided with lead-in wires 18. This cartridge advantageously may be fitted in the male coupling 16 by means of a liquid-tight plug. The electrically heated cartridge is so positioned as to project beyond the lower end of the male coupling 16 and into the cup of the spinneret 14, which is attached by means of a female coupling 20. The solution being charged through conduit 10 passes annularly between the outer wall of the cartridge and the inner wall of the male coupling 16 and thence into the spinneret 14. Since the electrically heated cartridge projects into the cup of the spinneret, the solution is maintained at an elevated temperature prior to extrusion. The temperature of the solution may be varied as desired or as conditions may require, but ordinarily will be within the range of 60° C. to 100° C. By heating the solution immediately prior to extrusion, its viscosity is materially reduced and a substantial reduction in operating pressure is effected. Furthermore, by increasing the fluidity of the solution at the point of extrusion, the water-swollen or gelled filaments can be pulled from the spinneret at a greater speed, thereby increasing the amount of fiber or yarn that can be produced from a particular unit.

The spinneret coupling 12 may be held by suitable means (not shown) above the cold aqueous coagulating or precipitating bath 22 in vessel 24 at any convenient angle. For example, the spinneret coupling may be positioned at less than a 90° angle to the surface of the aqueous coagulating bath 22 as shown in Fig. 1 of the drawing accompanying the present application or at approximately a 90° angle to the surface of the said bath as shown in Fig. 1 of the drawing of my aforementioned copending application Serial No. 772,200. The coupling preferably is positioned so that only the face of the spinneret contacts the coagulating bath.

As the solution is forced under pressure through the openings in the spinneret, it coagulates or precipitates in the form of solid, water-swollen or gelled filaments or fiber 26 upon entering the coagulating bath 22, which is maintained at a temperature not exceeding substantially +10° C. by any suitable means. For example, water may be refrigerated or cooled to the desired low temperature and circulated through the vessel 24, being introduced through the conduit 28 and withdrawn through the conduit 30. Alternatively, and as shown in Fig. 1 of the drawing accompanying my aforementioned copending application Serial No. 772,200, cooling coils through which is circulated a liquid coolant, e. g., a refrigerated brine solution, may be employed to maintain the bath 22 at the desired low temperature. It will be understood, of course, that various other means may be used to keep the bath 22 at or below +10° C. For instance, instead of employing means such as mentioned above, I may add ice alone to the bath, or a mixture of ice and sodium chloride or other salt, or ice and methyl or ethyl alcohol, or other suitable temperature depressants or mixtures thereof in order to reduce the bath of liquid coagulant comprising mainly water to the desired low temperature.

The coagulated fiber in gel state is led through the bath 22, which preferably is of the circulating type, by any suitable means. During passage of the fiber through the bath it is washed substantially free of salt.

The gelled fiber may be led through the bath 22 merely with the aid of a guide roll or sheave 32 to facilitate the passage of the fiber through the coagulating bath, as is shown in Fig. 1 of the drawing accompanying my aforementioned copending application Serial No. 772,200. Advantageously, however, the gelled fiber is led through the bath 22 with the aid of a submerged, power-driven godet 34 and multi-groove roll 36. For instance, the gelled fiber may be led through the bath 22 and out of it, as is shown in Figs. 1, 8 and 9, with the aid of guide roll 32, power-driven godet 34 and multi-groove roll 36. The gelled fiber is wrapped several times between the godet 34 and the multi-groove roll 36. This arrangement permits a long bath travel by multiple winds of synthetic fiber, without causing excessive tension on the fiber, such as may occur when a pair of multi-groove rollers alone is used in leading the fiber through the bath.

It is important that the coagulating bath 22 be at a temperature not exceeding substantially +10° C., and preferably at or below +5° C., e. g., −10° C. to 0° C. or +1° or +2° C. Temperatures below −15° C., e. g., −20° C. or lower, may be employed if desired, but such temperatures are more costly to secure and maintain, and no particular advantages appear to accrue therefrom. By the use of a low-temperature, aqueous coagulating bath as herein described, the shaped, coagulated or precipitated material, more particularly an extruded, water-swollen or gelled fiber or thread, is clear (transparent) or substantially clear, cohesive, has considerable elasticity and toughness, and is capable of being oriented, e. g., by stretching. In marked contrast, when the aqueous coagulating bath is substantially above +10° C., e. g., +20° C. or +25° C. or higher, the resulting fiber or thread usually either is opaque or shows considerable haze, is spongy and has little or no mechanical strength. Furthermore, it is either unstretchable or has a low order of stretchability, yielding on drying a brittle fiber or thread which cannot be used for textile purposes.

Furthermore, when multifilaments are produced with the aid of a low-temperature coagulating bath as herein described, the individual water-swollen or gelled filaments show no tendency to stick together. This was quite surprising and unexpected, as was also the fact that the swollen or gelled products could be washed substantially free of salt without difficulty, even in a cold coagulating bath, especially in view of the fact that these discoveries are directly contrary to the prior art teachings. For example, in Patent No. 2,404,716 and in numerous other patents it is stated that it has been found substantially impossible to use the solutions proposed in Rein Patent No. 2,140,921 in the production of yarns and films, and that their extrusion into coagulating baths, including such non-solvents for polyacrylonitrile as water, dilute acid solutions, dilute salt solutions, etc., results in the formation of shaped articles that contain large amounts of the inorganic salt component of the solvent. The prior art also teaches that these salts are distributed throughout the structure, that the latter possesses poor physical properties and that the removal of these salts, when possible, results in the formation of a porous, spongy, weak, undesirable structure that is very brittle and completely unsuited for use as a yarn or film. The prior art further teaches that when an attempt is made to form a multifilament yarn by extruding an aqueous sodium sulfocyanide (sodium thiocyanate) polyacrylonitrile composition into a dilute acid bath, the individual filaments that are obtained stick together to form an essentially monofilament structure which is extremely brittle and cannot be bent or worked without breaking. In marked contrast the synthetic fibers obtained by practicing the present invention are substantially free from salts, are tough and ductile even when first coagulated in the spinning or precipitating bath, and the individual filaments show no tendency to stick together when extruded through a spinneret into the cold aqueous bath.

In practice, the spun fibers are treated after leaving the coagulating bath in order to orient the molecules and thereby to increase the tensile strength and otherwise to improve the properties of the spun material. Orientation is preferably effected by stretching the fiber, while still in its water-swollen or gel state, in the presence of moisture and at a temperature within the range of about 70° C. to about 110° C., more particularly at a temperature of about 90° C. to about 100° C. This stretching may be effected, for example, in the manner illustrated in Fig. 1 of my aforementioned copending application Serial No. 772,200 or, preferably, as illustrated in Fig. 1 of the drawing accompanying the instant application.

With reference to Fig. 1 of the drawing of the present application, the fiber 26 after leaving the aqueous coagulating bath 22 passes over the revolving wheel or godet 38 and the auxiliary roller 39, being wrapped one or more (e. g., two or three) times about each, into the hot aqueous liquid medium 40, e. g., hot water, contained in the stretch trough 42, and thence over the godet 44 and the auxiliary roller 45, about each of which the fiber also is wrapped one or more (e. g., two or three) times. The peripheral speed of the godet 38 may be slightly greater than that of the godet 34. The godet 44 is caused to revolve at a peripheral speed greater than that of the godet 38; in other words, the surface speed of the godet 44 is such that the ratio of speeds of godets 38 and 44 is proportional to the desired stretch which is to be applied to the fiber as it passes through the hot aqueous liquid medium 40. After leaving the godet 44 the stretched or oriented, gelled fiber 46 passes over the guide roll or sheave 48 and then is collected on a take-up spool or bobbin 50 with the aid of the traverse guide 52. A small amount of water or other liquid medium adapted to maintain the stretched fiber in a gel state may be applied by any suitable means to the fiber as it is being collected on the bobbin 50. For instance, the revolving bobbin may be continuously sprayed with water as the fiber is being collected thereon. Instead of being wound upon a spool or bobbin the stretched fiber may be collected, for example, in a centrifugal pot whereby twist is advantageously applied to the wet fiber.

The amount of stretch that is applied to the water-swollen or gelled fiber may be varied widely, but in all cases should be sufficient to cause at least appreciable orientation of the molecules and an improvement in the properties of the fiber undergoing treatment. The amount of tension to which the fiber is subjected obviously should not be so great as to cause the fiber to break. Depending, for example, upon the type of material being stretched or elongated and the particular properties desired in the finished product, the amount of stretch may vary, for instance, from 100%, preferably from 200 or 300%, up to 4000% or more of the original length of the fiber.

The stretch trough 42 illustrates one suitable form of apparatus which may be used in the stretching operation. A perspective view of this trough is shown in Fig. 5; a transverse sectional view, in Fig. 6; while a fragmentary, sectional view taken along the line 7—7 of Fig. 6 is shown in Fig. 7. This trough is positioned between the godets 38 and 44 so that the fiber 26, which is tangent to the tops of the godets, is slightly above (e. g., about ⅛ inch above) the bottom of the V-shaped trough portion 54 as it passes through the hot aqueous liquid medium contained in the trough 42. The fiber 26 enters the stretch trough 42 slightly above the bottom portion of the U of the U-shaped slot 56 in the end wall 58 of the trough. The hot aqueous liquid medium in which the fiber is stretched is preferably circulated through the trough 42, entering the trough through the conduit 60 and leaving through the conduits 62 and 64.

As is shown in Figs. 5, 6 and 7, the V-shaped trough portion 54 is provided with a series of openings 66 in the bottom of the trough and in each of the sides forming the V. The hot aqueous liquid medium 40 enters the stretch trough 42 through the conduit 60, is forced through the openings 66, thereby mildly agitating the hot aqueous liquid in the trough. The liquid medium 40 flows along the V-shaped trough portion 54 into the collecting reservoirs 68 and 70 located at each end of the stretch trough 42, from which reservoirs it then passes through the conduits 62 and 64 to a supply reservoir (not shown).

The hot aqueous liquid medium 40 which is circulated through the trough 42 may be heated by any suitable means (not shown) to the desired temperature. For example, the water or other aqueous liquid medium employed may be heated electrically, or by gas, steam or other means, in a suitable heating unit having a supply reservoir and connecting conduits to and from the stretch trough 42 for circulation of the hot aqueous liquid medium between the supply reservoir and the stretch trough. To conserve heat and in order better to maintain the temperature of the aqueous liquid in the stretch trough, it is usually desirable to insulate the trough with suitable heat-insulation, e. g., glass fibers, asbestos, cork, etc., in board, sheet, tape or other form in which these materials are available for use as heat insulation. A suitable cover (not shown), which may be hinged or which merely may fit loosely over the top of the trough and is removable therefrom, also advantageously may be provided in order to reduce heat losses and to provide a better control of the temperature of the hot aqueous liquid in the stretch trough. Such a cover likewise is preferably insulated with a suitable insulating material such as one or another of those mentioned above by way of illustration. The cover is raised or removed (if detachable from the trough) when "threading-up" the apparatus, and is closed or put back into place after the thread has been positioned in the stretch trough.

Among the advantages of using a stretch trough of the kind described above, and shown in Figs. 5, 6 and 7 and in a portion of Fig. 1, may be mentioned the following:

The thread, during its stretching operation, may be subject to mechanical damage, i. e., filament breakage, abrasion, etc., if it comes in frictional contact with such devices as hooks, rollers or sheaves, which conventionally are used to submerge a thread in a bath. The above-described device avoids this defect by having no frictional contact on the thread during this critical operation. Another advantage accrues by reason of the slight lift imparted to the thread by the multitude of small jets of water under the thread, thereby preventing any possible sag and contact of the thread with the bottom of the trough.

With reference to Fig. 2 of the drawing, the stretched, gelled fiber 46 on the bobbin 50 is then treated with a liquid composition, more particularly an aqueous dispersion, containing an anti-static agent by placing the bobbin supported on a trunnion 72 in the vessel 74 containing the anti-static treating or finishing composition. The helices of gelled fiber on the bobbin are treated throughout their length with the liquid anti-static composition as the bobbin rotates while withdrawing the gelled fiber from the bobbin as indicated in Fig. 2. Any suitable anti-static agent may be employed. Examples of anti-static agents which may be used are the guanylurea and guanidine salts of monoaliphatic hydrocarbon esters of sulfuric acid, more particularly such salts wherein the aliphatic hydrocarbon grouping contains from 12 to 18 carbon atoms, inclusive, e. g., guanylurea octadecyl hydrogen sulfate, guanidine octadecyl hydrogen sulfate, guanidine oleyl hydrogen sulfate, etc. Still other examples of anti-static agents which may be used are β-alkoxypropionitriles, e. g., octadecoxypropionitrile; reaction products of ethylene oxide and a long-chain alkyl guanamine, e. g., octadecyl guanamine; and reaction products of ethylene oxide and a long-chain alkyl guanidine, e. g., octadecyl guanidine.

It is not essential that the liquid treating composition, e. g., an aqueous dispersion, which is applied to the stretched, gelled fiber 46 contain only an anti-static agent as the sole effect agent which is present in the composition. In some cases, however, it may be desirable or advantageous to use an anti-static agent alone as the sole effect agent, more particularly such agents which are inherently capable of functioning both as a lubricating agent and as an anti-static agent. In other cases it may be desirable to use the anti-static agent in conjunction with other conditioning or effect agents which are commonly employed in treating synthetic fibers, more particularly fibers produced from acrylonitrile polymerization products. Such auxiliary conditioning agents include mineral, vegetable and animals oils, among which latter may be mentioned blown and unblown neat's-foot oil, sperm oil, olive oil, teaseed oil, peanut oil, soya bean oil and cottonseed oil, as well as the various sulfonated oils, e. g., sulfonated olive oil. Examples of other conditioning agents that may be employed in conjunction with the aforementioned guanylurea salt or guanidine salt or other anti-static agent are wetting and dispersing agents and textile lubricants of various kinds, for instance N-octadecyl disodium sulfosuccinamate, dioctyl sodium sulfosuccinate, lecithin, esters of long-chain fatty acids, e. g., alkyl stearates, palmitates and oleates, more particularly the ethyl, propyl, butyl and amyl stearates, palmitates and oleates.

After being treated with the liquid finishing composition containing the anti-static agent, the treated, stretched fiber in gel state is led continuously over the drying rolls 76, thence to a pigtail thread guide 78 and finally to a suitable twister bobbin such, for example, as the ring twister 80 whereby the dry, twisted fiber or thread 82 is collected on the bobbin 84. Instead of the ring twister shown in each of Figs. 2, 3, 4 and 8, any other suitable type of twister, e. g., a cap twister, or other fiber take-up device adapted to cause the fiber to move over the drying rolls 76 and to be collected on a fiber or thread-storage device may be employed.

The drying unit shown by way of example in Figs. 2, 3 and 4 comprises two positively driven drums or rolls 86 and 88, suitably spaced from each other, e. g., 6 or 8 inches or more, suspended in the same plane, and rotating at the same peripheral speed. The rolls are slightly inclined (i. e., converge) toward each other at the delivery end thereby to advance the thread over the rolls. The degree of convergency may be varied as desired or as conditions may require in order to advance the thread in a plurality of helices over the rolls. Either one or both rolls may converge slightly toward each other at the delivery end, the degree of convergence being shown in an exaggerated manner in various figures of the drawing. With rolls 4 inches in diameter and 10 inches long, satisfactory results have been obtained by having the lower roll convergent to the upper roll, at the delivery end, by an angle of about 0.6°. If desired, both rolls may be tilted at a suitable angle to the horizontal, e. g., at an angle of approximately 5° to the horizontal.

Either or both of the rolls 86 and 88 may be heated by any suitable means. For example, the rolls may be heated and the advancing thread dried by blowing a blast of hot air or other hot gas over the surfaces of either or both rolls. Preferably, however, either or both rolls are hollow and are internally heated so as to provide a surface temperature on the exterior of the rolls within the range of about 40° C. to about 200° C., more particularly within the range of about 50° or 60° C. to 100° or 120° C. Thus the hollow rolls or drums may be internally heated electrically, or by steam, hot air or other gas, hot water or by any other suitable means. A simple method of internally heating either or both rolls is by radiation from electrical strip heaters positioned within the rolls, which heaters are mounted by clamping onto a support bar. The electrical connections for the heaters may be attached through the oval-shaped hollow plate 90. Preferably both rolls are internally heated.

From the foregoing description it will be seen that the advancing helices 92 of the treated gelled fiber are dried continuously, and that a portion of each helix is in contact with a heated surface, advantageously a smooth, heated surface so that the possibility of damage to the fiber as it advances over the rolls will be minimized. The temperature of this surface, the portion of each helix which is in contact therewith, the duration of said contact and the number of helices in contact with the heated surface are such that the helices of gelled fiber are dried. Because of the application of the anti-static agent to the gelled fiber prior to its passage over the heated rolls, there is no accumulation of an electrostatic charge on the fibers during their passage over the rolls and, therefore, no difficulty in the continuous drying of these particular fibers of an acrylonitrile polymerization product by the particular method herein described. In the absence of such a pretreatment of the wet, gelled fiber with a composition comprising an anti-static agent, it is extremely difficult, if not impossible, to successfully dry advancing helices of a wet fiber of an acrylonitrile polymerization product due to the charge of static electricity which the fiber accumulates (apparently mainly as a result of friction as the fiber passes over the surface of the roll), thereby causing spreading of the filaments in each helix so that successive helices may overlap and cause damage to the filaments. Furthermore, when the dry thread is delivered from the drying rolls to the twisting bobbin or other collecting device, the "ballooning" of the filaments caused by the accumulated static charge may cause mechanical damage to the thread when contacting friction points such as pigtail guide 78.

The rolls 86 and 88 may be made of any suitable material such, for example, as Monel metal, stainless steel, aluminum, chromium-plated copper, chromium-plated steel, anodized aluminum, dense graphite, fused quartz, glass, resin-impregnated glass fiber laminate, etc. The rolls are preferably made of a material which is a good heat conductor, that is, a material which will permit the rapid transfer of heat from the interior surfaces to the external surfaces of the roll. The rolls may be made of one base material, which then may be plated or otherwise covered with a smooth layer of another material, e. g., a chrome plating.

Fig. 3 illustrates another embodiment wherein the spinning solution of polymeric or copolymeric acrylonitrile is continuously spun to yield a water-swollen or gelled fiber 26 as has been described above with reference to Fig. 1. This gelled fiber is then stretched as it passes through a hot aqueous liquid medium, e. g., water at a temperature between about 70° C. and 100° C., more particularly at 90°–100° C., contained in the stretch trough 42. Stretching is effected with the aid of the godets 38 and 44 as likewise has previously been described with reference to Fig. 1. The stretched or oriented, gelled fiber 46 is then treated with a treating composition comprising an anti-static agent by continuously passing it through a trough 94 through which is circulated an anti-static treating composition, which may be of the kind described above with reference to Fig. 2. In Fig. 3 the trough 94 is shown as being of the same design as the stretch trough 42 (Figs. 1, 4, 5, 6 and 7), but it will be understood, of course, that any suitable vessel or container, which will hold or through which can be circulated the anti-static treating composition and through which the fiber can be continuously passed in contact with the said composition, may be employed. The anti-static treating composition which is circulated through the trough 94 may be at any suitable temperature, e. g., within the range of about 40° C. to about 70° C. Circulation of the anti-static composition through the trough is effected in the same manner as has previously been described with reference to the circulation of water through the stretch trough 42. After being treated with the liquid finishing composition containing the anti-static agent, the treated, stretched fiber in gel state is then continuously dried by passing the fiber over the drying rolls 76 as has been described above with reference to Fig. 2.

Fig. 4 illustrates an embodiment which differs from the embodiment shown in Fig. 3 in that, instead of using separate baths for stretching the fiber and for treating it with a composition comprising an anti-static agent, both operations are effected by continuously passing the gelled fiber 26 through a combination stretch and anti-static treating bath 96. During its passage through this bath the gelled fiber 26 is stretched with the aid of godets 38 and 44 in contact with a liquid medium comprising water and, also, is simultaneously treated with an anti-static agent (numerous examples of which have been given hereinbefore), since such an agent likewise is a component of the liquid medium. The temperature of the liquid medium constituting the combined stretch and anti-static treating bath may be considerably varied, but is usually within the range of about 70° C. to about 100° C. The stretched gel, which has been treated with an anti-static agent conjointly with stretching to orient its molecules along the fiber axis, is then continuously dried by passing the fiber over the drying rolls 76 as has been described above with reference to Fig. 1.

Figs. 8 and 9 illustrate still another embodiment. In the embodiment there shown the spinning solution of polymeric or copolymeric acrylonitrile is continuously spun to yield a water-swollen or gelled fiber 26 as has been described above with reference to Fig. 1. The fiber then passes over the guide rolls 98 and 100, and thence over the mechanically driven godet 102 and the auxiliary roller 104, being wrapped one or more (e. g., two or three) times about each. The peripheral speed of the godet 102 may be slightly greater than that of the godet 34. The fiber is then carried down into the hot aqueous liquid medium 40 contained in the vessel 106, which is provided with suitable inlet and outlet conduits (not shown) for circulating the hot aqueous medium, e. g., hot water at a temperature of about 70° C. to about 100° C., preferably at 90°–100° C., through the vessel. In the vessel 106 the fiber passes over the roller 108 and is then carried upwardly to the cylindrical rollers 110 and 112 about which it is wrapped to form a plurality of helices. The rollers 110 and 112 rotate at the same peripheral speed. The peripheral speed of the rollers 110 and 112 is greater than that of the godet 102 and is adjusted so as to apply the desired stretch or elongation to the fiber as it passes through the hot aqueous medium 40.

The rollers 110 and 112 converge slightly in going from the feed-on end to the delivery end, as previously has been described with reference to the drying rolls shown in Figs. 2, 3 and 4, thereby to cause the fiber to advance in a helical path over the rollers to the delivery end. These rollers are internally divided by insulating sections 114 and 116, the outer cylindrical walls of which are perforated with suitable holes, slots or openings of other shape in order to permit the rapid escape of heat therefrom during operation of the apparatus. The sections 118 and 120 are unheated, while sections 122 and 124 are heated.

As the stretched, gelled fiber advances over the unheated sections 118 and 120 of the rollers 110 and 112, a finishing composition containing an anti-static agent is sprayed upon the lower roller 112 from jets 126 attached to supply conduit 128. As the finishing composition flows down over the roll, it contacts the wet gelled fiber and thence drips or flows into the basin 130 provided with conduit 132 for withdrawing the excess finishing composition. The finishing composition containing the anti-static agent, numerous examples of which have been given before, is usually heated prior to spraying it upon the roller, e. g., to a temperature of the order of 40° to 70–80° C.

(Instead of applying the anti-static finishing composition to an unheated section of rolls such as those shown in Figs. 8 and 9, I have found that effective results also can be obtained by using rolls which are internally heated and applying the anti-static composition, as by spraying, to the fiber at the feed-on end of the rolls, which are so heated that the surface temperature at the feed-on end is less than the temperature at the delivery end.)

Instead of spraying only the liquid composition containing the anti-static agent upon the roller 112 as shown, a plurality of sprays and of catch basins for collecting the surplus may be provided for spraying different liquid compositions, in addition to such a composition containing an anti-static agent, upon this roller. For example, a spray of water alone may be applied thereto followed by a spray of the liquid anti-static composition; or, the application of the anti-static material may be preceded by a spray of another conditioning or effect agent such, for example, as an emulsion of a textile lubricant in the event that the particular finishing composition containing an anti-static agent which is employed is lacking the same or is unable to lubricate the fiber adequately.

The wet, treated, stretched fiber continues to move in a helical path from the unheated sections 118 and 120, over the insulating sections 114 and 116, and thence over the heated sections 122 and 124. As the helices pass over these heated sections, the fiber is continuously dried in the same manner as previously has been described with reference to Figs. 2, 3 and 4. The heated sections 122 and 124 are heated, for example, by the passage of steam, hot water or other hot liquid from the supply conduit 134 through the rotary joints 136 and 138 and thence to the interior of the sections, the fluid medium being withdrawn from the system through the conduit 140.

The dried fiber 142 is led from the delivery end of the roller 110 to a pigtail thread guide 144 and thence to a suitable twister bobbin such, for example, as the ring twister 146 whereby the dry, twisted fiber or thread is collected on the bobbin 148.

It will be understood, of course, by those skilled in the art that the solution of the polymeric or copolymeric acrylonitrile in the chosen solvent should be of such a concentration that a composition having a workable viscosity is obtained. The concentration of the polymerization product will depend, for example, upon the particular solvent and extrusion apparatus employed, the diameter of the fiber to be spun and the molecular weight of the polymerization product, which usually is within the range of 15,000 to 300,000, as calculated from viscosity measurements by the Staudinger equation, and advantageously is of the order of 35,000 or 40,000 to 140,000 or 150,000. The concentration of polymer or copolymer may range, for example, from 7 or 8% up to 18 or 20% by weight of the solution. The viscosity of the solution, as determined by measuring the time in seconds for a Monel metal ball ⅛ inch in diameter to fall through 20 cm. of the solution at 61° C., may be, for instance, from 10 to 500 seconds. It has been found that the best spinning solutions from the standpoint of coagulation and optimum properties of the precipitated gel are those which contain the highest concentration of polymer and the lowest concentration of zinc chloride, sodium or calcium thiocyanate, guanidine thiocyanate or other salt of the kinds aforementioned, which concentrations are consistent with solubility and viscosity limitations. A concentration of 15% polymeric or copolymeric acrylonitrile in 50–60% sodium or calcium thiocyanate solution has been found to give very satisfactory results. The viscosity of the solution should not be so high that it is difficult to filter or to stir and deaerate prior to use.

As has been pointed out hereinbefore and in my aforementioned copending application Serial No. 772,200, the temperature of the aqueous coagulating bath is critical in the formation of a useful, workable, polymeric or copolymeric acrylonitrile fiber or other structure. When the polymerization product is coagulated in water at a temperature substantially above +10° C., e. g., at 20° or 25° C. or higher, an opaque, weak, non-ductile structure results. This structure becomes increasingly weak and less transparent the higher the temperature of coagulation above about +10° C. However, by coagulating in a liquid coagulant comprising water at or below +10° C., e. g., in water at +1 to +5° C., or in an alcohol-water mixture at lower temperatures, e. g., at 0° to —10° C., the coagulated product is clear or substantially clear, cohesive, tough, ductile and capable of being oriented in its water-swollen or gel state. Generally speaking, the clearer the gelled or coagulated material, the greater its ductility. After coagulation and washing, the product contains at the most only a barely detectible amount of salt from the salt solution used as a solvent and is substantially homogeneous in structure.

In order that those skilled in the art better may understand the mode of operation, the following examples are given by way of illustration and not by way of limitation. All parts and percentages are by weight.

*Example 1*

One hundred parts of water-free acrylonitrile was mixed with 1470 parts of water in a jacketed container provided with a stirrer. The mixture was heated to 40° C., and 0.75 part of ammonium persulfate, 0.75 part of sodium metabisulfide and 1.87 parts of sodium sulfate were added thereto in the order just given. The polymerization reaction was allowed to proceed for two hours with the jacket temperature so adjusted as to keep the temperature of the reaction mass at 40° C. The resulting slurry was filtered, and the cake was washed by re-slurrying in water and re-filtering until a negative test for sulfate ion was obtained. The washed, crumbly mass of polyacrylonitrile was spread on stainless steel trays and dried for about 16 hours at 65° C. in a circulating air oven. The dry "crumb" was then ball-milled to a fine powder. A solution of 1 gram of the powdered polyacrylonitrile in 100 ml. of 60% sodium thiocyanate had a viscosity of 41.5 centipoises as determined at 40° C. using an Ostwald-Cannon-Fenske viscosimeter.

Ninety-three parts of a 53% aqueous solution of calcium thiocyanate was adjusted to a pH of 7.0 with dilute hydrochloric acid. This solution was cooled to −10° C. in a "Dry Ice" (solid carbon dioxide)-acetone bath. Seven parts of polyacrylonitrile, produced as above described, was mixed into the cooled aqueous solution of calcium thiocyanate with rapid stirring.

The resulting slurry was transferred to a mixing unit comprising a jacketed stainless steel tank provided with a cover and a stirrer, and was stirred therein for 48 hours at 45° C. under an atmosphere of carbon dioxide in order to effect complete solution of the polyacrylonitrile in the aqueous calcium thiocyanate. The resulting solution was filtered by forcing it through a sand filter under 40 pounds carbon dioxide pressure. The filtered solution was held under vacuum for several days at 25° C. until all of the gas bubbles had been removed. The resulting gas-free solution was then held under vacuum for an additional 18 hours prior to use as a spinning solution. The polymer content of the solution, as determined by casting, drying and weighing a film of the cast solution, was 7%. The viscosity of the solution, as determined by measuring the time for a Monel ball, ⅛ inch in diameter and weighing 0.142 gram, to fall through 20 centimeters of the solution maintained at 61° C., was 208 seconds.

The above solution was spun into fibers by extruding it through a 40-hole spinneret with holes of 110 microns diameter into a coagulating bath consisting of water cooled to 1–2° C. The solution was heated inside the spinneret prior to extrusion by means of a steam-heated "finger." The coagulated fiber was carried back and forth through the bath by means of a power-driven, submerged godet position at one end of the bath and a set of free-running rollers at the other end. The total bath travel of the gelled fiber was about 144 inches.

The spun fiber was led out of the coagulating bath over several guide rollers and a driven godet through a 12-inch trough containing water heated to 98–99° C. The fiber was stretched in this bath about 600% by leading it over a second driven godet, the peripheral speed of which was greater than that of the previous godet, and thence over a roller onto a take-up bobbin. The take-up bobbin was provided with a traverse motion and was continuously sprayed with water to retain the fiber in the gel state. When sufficient thread had been spun the bobbin was removed and submerged in water to remove any residual calcium thiocyanate that may have been present in the gelled thread.

The bobbin of wet gelled yarn was then suspended in a trough containing an aqueous dispersion of 1% of an anti-static agent, specifically guanidine octadecyl hydrogen sulfate, and 0.5% of a textile lubricant, more particularly butyl stearate. The dispersion was maintained at 40°–50° C.

Yarn from the immersed bobbin and which had been treated with a dispersion containing an anti-static agent was continuously led over a drying unit consisting of two, positively driven, stainless steel rolls, each of which was 4 inches in diameter and 10 inches long, and which were suspended in the same plane 8 inches apart and were slightly inclined toward each other at the delivery ends thereby to advance the thread over the roll. Each roll was electrically heated internally so as to provide an external surface temperature of about 65–70° C., and was rotated at a peripheral speed of about 33.8 meters per minute. The wet gelled yarn was helically wound around both rolls to form 42 loops or helices, each having an average circumference of about 0.724 meter. The dried yarn was then led directly from the delivery end to a ring twister for an insertion of 1.8 turns per inch S twist. The yarn dried satisfactorily without accumulation of an electrostatic charge, and with no damage to the dried fibers or any operating difficulties during drying.

The finished yarn had a denier of 115, contained 0.92% by weight of the dried untreated yarn, of "finish," had a dry tensile strength of 4.5 grams per denier, a wet tensile strength of 3.6 grams per denier, and dry and wet elongations of 14%.

*Example 2*

One part of methyl acrylate and 19 parts of water-free acrylonitrile were mixed with 329 parts of water in a jacketed container provided with a stirrer. The mixture was heated with stirring to 40° C., after which 0.3 part of ammonium persulfate, 0.3 part of sodium metabisulfite and 0.33 part of sodium sulfate were added thereto in this order. The reaction was allowed to proceed for 4 hours with the jacket temperature so adjusted as to keep the reaction mass at 40° C. The resulting slurry was filtered, washed, dried and ball-milled in the same manner as described under Example 1 with the exception that the washed "crumb" was dried for about 16 hours at 60° C.

A solution of 1 gram of the methyl acrylate-acrylonitrile copolymer in 100 ml. of 60% sodium thiocyanate had a viscosity of 23.7 centipoises at 40° C. using an Ostwald-Cannon-Fenske viscosimeter.

Ninety-three parts of a 53% aqueous solution of calcium thiocyanate was adjusted to a pH of 6.8 with dilute hydrochloric acid. This solution was cooled to −10° C. as described under Example 1, after which 7 parts of the above-described copolymer of acrylonitrile and methyl acrylate was mixed therein with rapid stirring. The resulting slurry was treated as described under Example 1 in order to dissolve the copolymer in the aqueous calcium thiocyanate solution and to obtain a de-aerated solution of copolymer which would be suitable for spinning.

The amount of copolymer in the above-described spinning solution was 7%, as determined by casting, drying and weighing a film of the cast solution. The falling ball viscosity of this copolymer solution at 61° C., as determined by the method described under Example 1, was 33.6 seconds.

This solution was spun and stretched to obtain an oriented fiber formed of a copolymer of acrylonitrile and methyl acrylate in exactly the same manner set forth under Example 1 with the exception that the fiber was stretched 900% in the stretch bath.

The bobbin containing the collected, wet, gelled copolymer yarn or fiber was suspended in a trough containing an aqueous dispersion of 2% guanylurea octadecyl hydrogen sulfate (anti-static agent) and 1% of N-octadecyl disodium sulfosuccinamate (dispersing agent). This dispersion was maintained at a temperature of 40°–50° C.

The treated yarn was continuously dried, with no accumulation of an electrostatic charge during drying, in exactly the same manner described under Example 1 with the exception that the external surface temperature of the electrically heated rolls was about 70°–75° C. The dried yarn had a denier of 85, a "finish" content of 2.2% based on the weight of the dry, untreated yarn, a dry tensile strength of 4.6 grams per denier, a wet tensile strength of 4.5 grams per denier, and dry and wet elongations of 12%.

Example 3

A copolymer of acrylonitrile and acrylamide was prepared by first dissolving 198 parts of acrylonitrile in 2197 parts of water, to which was added 224.4 parts of a 9.8% aqueous acrylamide solution. The temperature of the solution was brought to 38° C. and then 3.5 parts of sodium metabisulfite was added, followed by 3.5 parts of ammonium persulfate. When surrounded by a water bath at 40° C., the temperature of the reaction mixture increased during the first 20 minutes to 44° C. and then gradually decreased until it was 40° C. at the end of 60 minutes. After continuing the reaction for another 60 minutes at 40° C. the copolymer of 90% acrylonitrile and 10% acrylamide was filtered off, washed and dried. One gram of this copolymer, dissolved in 60% sodium thiocyanate solution to make 100 ml. at 20° C., gave a solution having a viscosity of 19.2 centipoises at 40° C.

Fifteen parts of the copolymer prepared as described above was dissolved at 45° C. in 85 parts of 55% aqueous sodium thiocyanate to yield a solution having a ball-fall viscosity (as previously described) of 407 seconds at 61° C. After filtering and de-aerating, the solution containing 15% copolymer was extruded through a metal spinneret having 100 holes, the diameter of the holes being 55 microns. The solution was heated to reduce the viscosity before extrusion by using a steam-heated "finger" inside the spinneret. Extruding at the rate of 1.53 grams of solution per minute, the fiber was coagulated in water at 5° C. The extruded fiber formed a multifilament thread with complete separation of all of the filaments. The fiber was drawn from the spinneret with 9.5 inches of bath travel to a roller and thence vertically to a godet with a peripheral speed of 1.39 meters per minute. The highly hydrated fiber was clear, tough and ductile. After wrapping the fiber 2½ times around the aforementioned godet, the fiber was carried through 24 inches of bath travel in water at 98° C. and thence to a second godet with a peripheral speed of 18.5 meters per minute around which the fiber was wrapped 2½ times. The peripheral speed of the second godet was 13.3 times that of the first godet. The stretched fiber was wound on a bobbin while still wet, a spray of water being maintained on the bobbin to prevent any drying out of the fiber.

The bobbin of wet gelled yarn was then suspended in a trough containing an aqueous dispersion of 1% of guanidine octadecyl hydrogen sulfate (anti-static agent) and 0.5% of butyl stearate (textile lubricant). The dispersion was maintained at 40°–50° C.

The treated yarn was continuously dried, with no accumulation of static electricity during drying, in exactly the same manner described under Example 1 with the exception that the external surface temperature of the electrically heated rolls was about 70°–75° C.

Example 4

To a solution of 40° C. comprising a mixture of 8774 parts of water, 914 parts of a 9.64% aqueous acrylamide solution and 792 parts of acrylonitrile was added with constant stirring 16 parts of sodium metabisulfite followed by 16 parts of ammonium persulfate, each being added as a concentrated aqueous solution. The polymerization was carried out in a jacketed vessel, and by applying cooling during the early stage of the polymerization the temperature of the reaction mass was held at 40° C. After a total of 2 hours the polymer slurry was filtered, and the isolated polymer was washed, dried and ball-milled. One gram of the dry copolymer, dissolved in a 60% aqueous sodium thiocyanate solution to make 100 ml. at 20° C., had a viscosity at 40° C. of 21.5 centipoises.

Seven parts of the dry copolymer powder was dissolved in 93 parts of a 50% aqueous calcium thiocyanate solution. After filtering and de-aerating, the solution had a viscosity of 18.5 seconds as determined by the time for a Monel ball, ⅛-inch in diameter, to fall through 20 centimeters of the solution maintained at 61° C.

The solution was extruded through a 40-hole spinneret with holes of 90 microns diameter into water at 3° C. To assist in the extrusion the solution was heated to about 60° C. inside the spinneret by means of an electrical heating device such as that briefly described hereinbefore and more fully in my copending application Serial No. 772,200 with reference to Fig. 2 of the drawing accompanying that application. The solution was extruded downwardly at a rate of 6.86 grams per minute, and the multifilament fiber thereby formed was led first to a hook and thence upwardly to submerged rollers so that the total bath travel was 21 inches. The fiber was then led to a godet of 50 mm. diameter, hereafter referred to as G–1, around which the fiber was wrapped three times. Thereafter the fiber was led to a second godet of 125 mm. diameter, hereafter referred to as G–2, around which it was wrapped two times. G–1 and G–2 both rotated at 16 R. P. M., thereby applying a preliminary stretch of 2½ times to the fiber. From G–2 the fiber was led through a water bath at 98°–99° C. for a bath travel of 24 inches and thence to a 94.5 mm. diameter spool which rotated at 81 R. P. M. The stretch between G–2 and the spool was 3.83 times, and the over-all stretch between G–1 and the spool was 9.6 times.

The spool of wet gelled fiber was then suspended in a trough containing an aqueous dispersion of 1 part of guanylurea octadecyl hydrogen sulfate in 99 parts of water. This dispersion was maintained at a temperature of 40°–50° C.

The treated yarn was continuously dried, with no accumulation of an electrostatic charge during drying, in exactly the same manner described under Example 1 with the exception that the external surface temperature of the electrically heated rolls was about 70°–75° C.

It will be understood, of course, by those skilled in the art that, in carrying out the method, I am not limited to the specific polymerization products and solutions thereof, the specific anti-static agents nor to the specific conditions of spinning, stretching, anti-static treatment and drying given by way of illustration in the above examples. Thus, instead of the particular copolymers employed in Examples 2, 3 and 4 I may use any other thermoplastic copolymers of a major proportion of acrylonitrile and a minor proportion of another monomer or monomers copolymerizable therewith, numerous examples of which latter have been given hereinbefore and in my aforementioned copending application Serial No. 772,200. Likewise, I am not limited to the particular proportions of copolymerizable monomers as set forth in Examples 2, 3 and 4. Thus, I may use methyl acrylate or acrylamide as comonomers with acrylonitrile in various other proportions within the range of, by weight, from about 85% to about 97% of acrylonitrile to from about 15% to about 3% of methyl acrylate or acrylamide, more particularly within the range of, by weight, from about 90% to about 95% of acrylonitrile to from about 10% to about 5% of methyl acrylate or acrylamide. Similar ranges of proportions also may be used advantageously in many cases with other comonomers, for example such comonomers as those mentioned previously herein by way of illustration.

Of the copolymeric acrylonitriles used, I prefer to employ an acrylonitrile copolymer containing in the copolymer molecules an average of at least about 85% by weight of combined acrylonitrile. In such copolymeric products, the proportions of monomers in the polymerizable mixture from which the copolymers are made preferably are adjusted so that the final copolymer contains in the molecules thereof an average of at least about 85% by weight of acrylonitrile (combined acrylonitrile). The expression "acrylonitrile polymerization product containing in the molecules thereof an average of at least about 85% by weight of combined acrylonitrile," as used herein, means a polymerization product (polymer, copolymer of interpolymer or mixture thereof) containing in its molecules an average of at least about 85% by weight of the acrylonitrile unit, which is considered to be present in the individual polymer molecule as the group

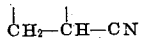

or, otherwise stated, at least about 85% by weight of the reactant substance converted into and forming the polymerization product is acrylonitrile (combined acrylonitrile).

Likewise, it will be understood by those skilled in the art that I am not limited to the specific anti-static agents nor to the specific finishing compositions containing such an agent that are given in the above illustrative examples, since any other anti-static agent or composition containing the same, numerous examples of which have been given hereinbefore, and which is adapted to obviate or retard materially the accumulation of static electricity during the continuous drying of the helices of the wet, gelled fiber as hereinbefore described, may be employed.

The anti-static agent may be applied to the gelled fiber prior to drying by any suitable means, but preferably it is applied in the form of a liquid dispersion, more particularly an aqueous dispersion. This dispersion may contain any suitable amount of anti-static agent, but ordinarily such an agent is present in the dispersion in an amount corresponding to from about 0.5% to about 5% by weight thereof. The dispersion may be applied, for example, by immersing the fiber in the dispersion, or by spraying or otherwise contacting the fiber with the dispersion. In applying the dispersion, it is preferably heated to an elevated temperature, e. g., from about 45° or 50° to about 95° C., or in some cases even as high as 100° C. With some anti-static agents the dispersion containing the same may be applied at room temperature (20°–30° C.) or at temperatures up to 45° C., but such temperatures may be less desirable with other anti-static agents because of the greater difficulty in maintaining the anti-static agent homogeneously dispersed in water or other volatile liquid dispersion medium at the lower temperature. Upon continuously drying the treated, gelled fiber as hereinbefore described, the dried fiber has the anti-static agent deposited at least on the outer surfaces thereof. The amount of anti-static agent which is present in or on the dried, treated fiber may vary considerably, but ordinarily it is present therein or thereon in an amount, by weight, corresponding to from about 0.2% to about 4% of the dried, untreated fiber.

The liquid composition containing the anti-static agent may be applied to the wet, gelled fiber at any suitable stage during its production and prior to continuous drying of the same as hereinbefore described. As previously has been mentioned, it may be applied during the stretching of the wet spun fiber to orient the molecules thereof; or it may be applied between any of the guides or godets or other rolls employed in the spinning process and which precede the continuous drying of the wet fiber. In some cases the gelled fiber may be dyed, treated with an anti-static agent, and the wet, dyed fiber in gel state then may be continuously dried as previously has been described with particular reference to an undyed, gelled fiber.

If desired, the finishing composition containing the anti-static agent which is deposited in or on the treated, dried fiber may be allowed to remain in place during and after the production of the article in its ultimate form, especially in those cases wherein the treated fiber or fabric or other textile or article made from the same is not later to be dyed. If the dried, treated fiber or fabric or other textile or article produced from the fiber is to be dyed, then the finishing composition containing the anti-static agent is usually removed therefrom prior to dyeing, for example by means of the usual aqueous scouring baths.

The method herein described, and originally claimed in parent application Serial No. 68,370, provides a rapid and economical means of continuously drying wet spun, stretched fibers of acrylonitrile polymerization products, which fibers have been produced as disclosed and specifically claimed in my aforementioned copending application Serial No. 772,200. Dried fibers of uniform characteristics are obtained rapidly, at low operating cost due to the continuous drying technique employed and with less thread damage than when a package-spun, e. g., bobbin or cake, wet thread is dried as a package and later unwound for twisting or rewinding.

The term "fiber" as used generically herein is intended to include within its meaning both monofilaments and multifilaments.

I claim:

1. Apparatus for contacting a continuously moving thread with a liquid, said apparatus comprising a vessel having a bottom portion and side and end portions, each of the end portions being provided with an opening adapted for the passage therethrough of the moving thread; a trough-like member positioned within said vessel, said member being spaced from said end portions and being aligned with the openings therein, and the walls defining said trough-like member being provided with a plurality of spaced apertures extending longitudinally from one end to the other end of the said member; inlet reservoir means beneath said trough-like member; means for introducing a liquid to said inlet-reservoir means; and means for withdrawing liquid from said vessel after its passage through the apertures of said trough-like member.

2. Apparatus for contacting a continuously moving thread with a liquid, said apparatus comprising a vessel having a bottom section and vertical side and end sections united to said bottom section, each of the end sections being provided with a slot for the passage therethrough of the moving thread; a trough positioned within said vessel, said trough being spaced from said end sections and being aligned with the slots therein, at least the bottom portion of the said trough being provided with a plurality of spaced apertures extending longitudinally from one end to the other end thereof; inlet-reservoir means beneath said trough; a conduit for introducing a liquid to said inlet-reservoir means; and means for withdrawing liquid from said vessel after its passage through the apertures of said trough.

3. Thread-treating apparatus including an appliance for the liquid treatment of a continuously moving thread, said appliance comprising a rectangular vessel having a bottom section and vertical side and end sections joined to said bottom section, each of the end sections being provided with a slot for the passage therethrough of the moving thread; a V-shaped trough positioned within said vessel and spaced a sufficient distance from the said end sections as to provide a collecting reservoir at each end of the said trough, the bottom of the said trough being aligned with the slots in the said end sections, and both the bottom portion and the angular walls forming the sides of the said trough being provided with a plurality of spaced apertures extending longitudinally from one end to the other end thereof; inlet-reservoir means beneath said V-shaped trough, said means including a portion of the bottom section of the said rectangular vessel; a conduit for introducing a liquid to said inlet-reservoir means; means for withdrawing liquid from said vessel after its passage through the aforesaid apertures; and means for continuously moving the thread to be treated through the said appliance.

4. Thread-treating apparatus including an appliance for the liquid treatment of a continuously moving thread, said appliance comprising a rectangular vessel having a bottom section, which is provided at each end thereof with a recessed extension so as to form a collecting reservoir, and vertical side and end sections rigidly united to said bottom section, each of the end sections being provided with a slot for the passage therethrough of the moving thread; a V-shaped trough positioned within said vessel and spaced at such distance from said end sections that each end of said trough is substantially in vertical alignment with the innermost part of the said recessed extension in said bottom section, the bottom of the said trough being aligned with the slots in the said end sections, and both the bottom portion and the angular walls forming the sides of the said trough peing provided with a plurality of small, spaced apertures extending longitudinally from one end to the other end thereof; inlet-reservoir means positioned beneath said V-shaped trough; a conduit for introducing a liquid to said inlet-reservoir means, said conduit being connected to the bottom portion of said inlet reservoir at a point which is approximately in the center of said bottom portion; conduits for withdrawing liquid from each of the aforementioned collecting reservoirs after the liquid has passed through the aforesaid apertures; and means for continuously moving the thread to be treated through the said appliance.

ARTHUR CRESSWELL.

REFERENCES CITED

The following references are of record in the file of this patent:

UNITED STATES PATENTS

| Number | Name | Date |
| --- | --- | --- |
| 1,897,122 | Hartmann | Feb. 14, 1938 |

Certificate of Correction

Patent No. 2,558,734

July 3, 1951

ARTHUR CRESSWELL

It is hereby certified that error appears in the printed specification of the above numbered patent requiring correction as follows:

Column 3, line 18, for "patent" read *parent*; column 4, line 54, for "products" read *product*; line 64, for "calicum" read *calcium*; column 14, line 62, for "metabisulfide" read *metabisulfite*; column 15, line 43, for "position" read *positioned*; column 16, line 11, for "1.8" read *2.8*; column 18, line 2, for "solution of" read *solution at*; column 20, line 7, for "temperature" read *temperatures*; column 21, line 2, for "inlet reservoir" read *inlet-reservoir*; column 22, line 23, for "peing" read *being*;

and that the said Letters Patent should be read as corrected above, so that the same may conform to the record of the case in the Patent Office.

Signed and sealed this 12th day of February, A. D. 1952.

[SEAL]

THOMAS F. MURPHY,
*Assistant Commissioner of Patents.*